(12) United States Patent
Ye

(10) Patent No.: US 6,765,722 B2
(45) Date of Patent: Jul. 20, 2004

(54) POLARIZATION BEAM COMBINER FOR FIBER OPTIC APPLICATIONS

(75) Inventor: Feng Ye, Alameda, CA (US)

(73) Assignee: DiCon Fiberoptics, Inc., Richmond, CA (US)

( * ) Notice: Subject to any disclaimer, the term of this patent is extended or adjusted under 35 U.S.C. 154(b) by 0 days.

(21) Appl. No.: 09/738,519

(22) Filed: Dec. 15, 2000

(65) Prior Publication Data

US 2002/0101634 A1 Aug. 1, 2002

(51) Int. Cl.[7] .................................................. G02B 5/30
(52) U.S. Cl. ...................... 359/494; 359/484; 359/495; 359/496; 359/497; 385/34
(58) Field of Search ................................ 359/484, 494, 359/495–497; 385/34

(56) References Cited

U.S. PATENT DOCUMENTS 5,299,056 A * 3/1994 Kurata et al. ............... 359/341
5,892,868 A * 4/1999 Peck, Jr. et al. .............. 385/34
5,909,310 A * 6/1999 Li et al. ...................... 359/484

* cited by examiner

Primary Examiner—Audrey Chang
Assistant Examiner—Craig Curtis
(74) Attorney, Agent, or Firm—Parsons Hsue & de Runtz LLP

(57) ABSTRACT

Two optical input channels carry two input optical signals in orthogonal polarization states while located at different radial distances relative to a GRIN lens, so that the two input signals exit the lens at different angles. The two signals exiting the lens pass through an optical member having transverse optical axes where the member has different indices of refraction along the two axes. The member passes and combines the two input optical signals into one signal plus a single output optical channel.

8 Claims, 3 Drawing Sheets

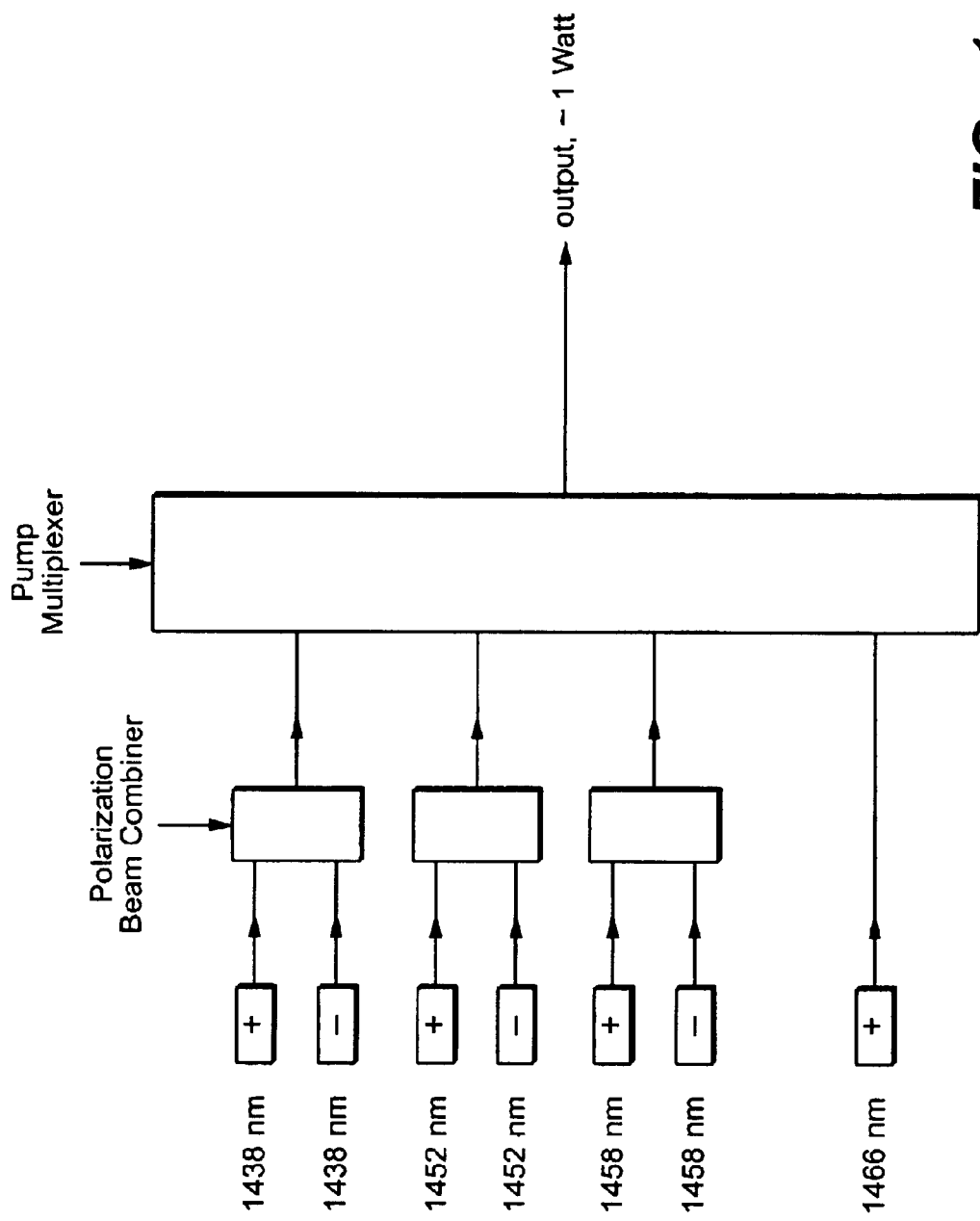
FIG._1

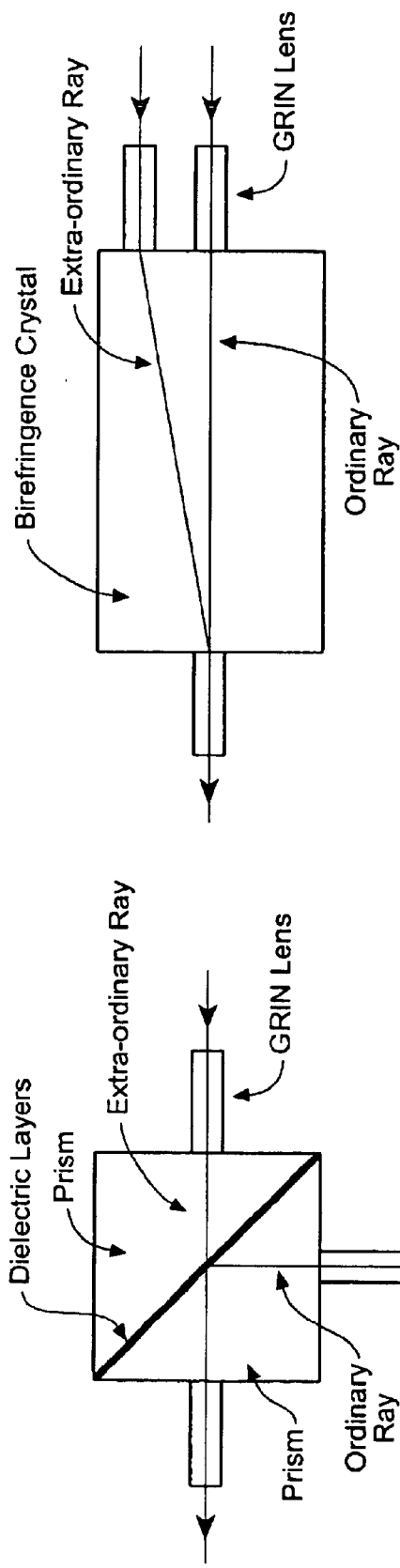
FIG._2B
FIG._2A
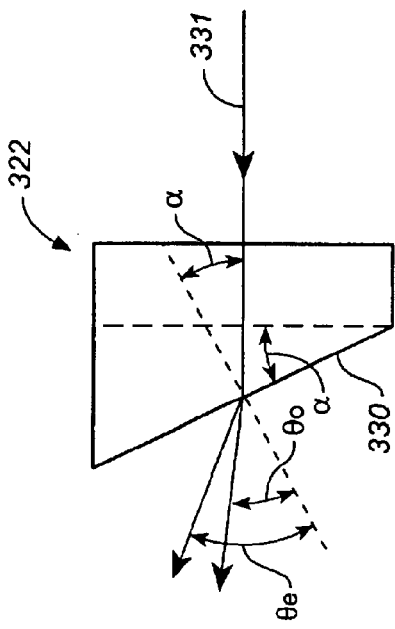
FIG._4

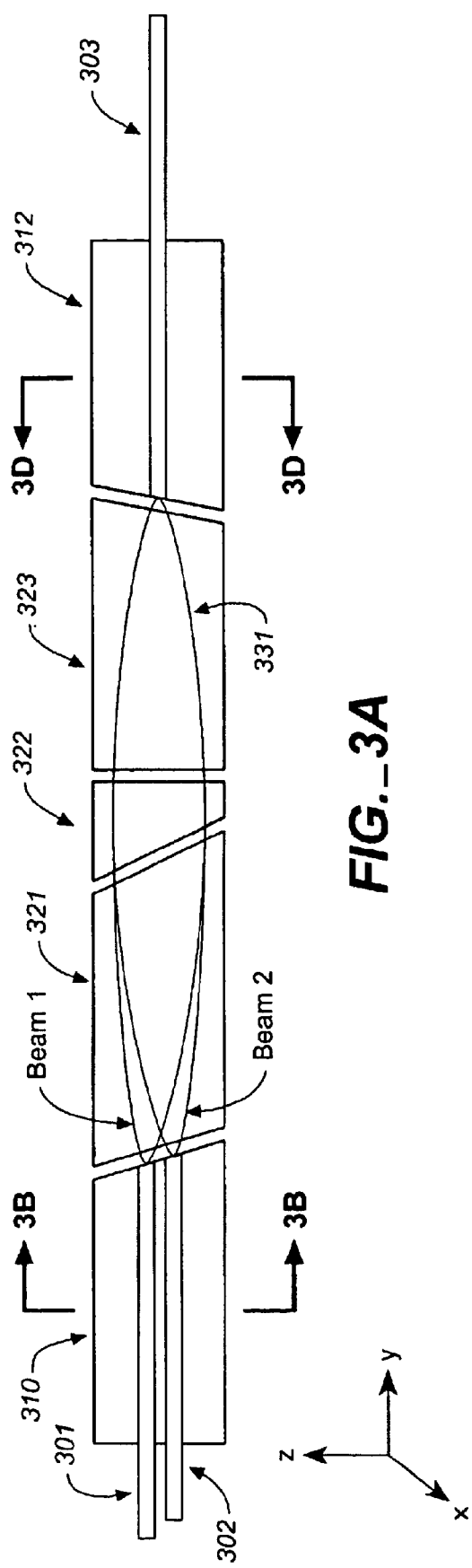
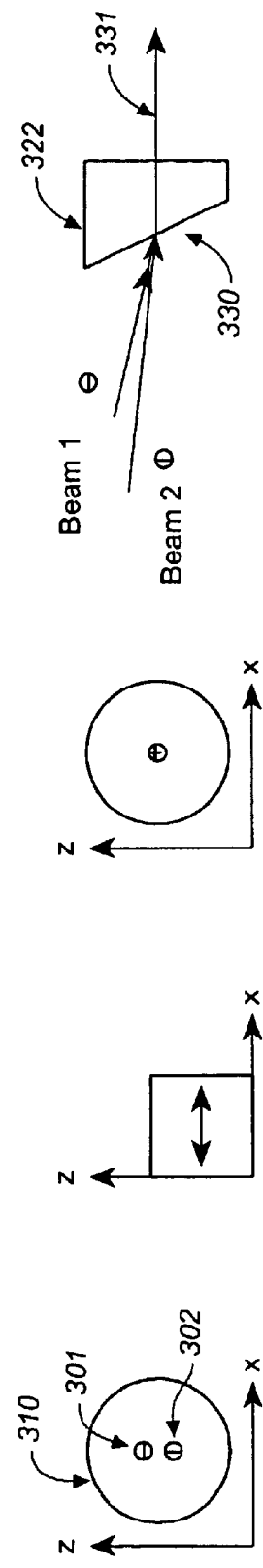
FIG._3A
FIG._3B  FIG._3C  FIG._3D  FIG._3E

POLARIZATION BEAM COMBINER FOR FIBER OPTIC APPLICATIONS

BACKGROUND OF THE INVENTION

This invention relates in general to optical components used in optical communication, and in particular a polarization beam combiner for fiber optic applications.

In an effort to keep pace with bandwidth demands nearly doubling annually, Wavelength Division Multiplex (WDM) system designers are moving to more cost effective solutions utilizing higher channel counts, higher transmission speeds and longer distance. This move drives up the need for more power in optical fibers.

The Erbium-Doped Fiber Amplifiers (EDFA) and Raman Amplifiers are two of most popular devices for amplifying the optical signal along the fiber. Diode pump lasers in 980 nm, 1480 nm and 14xx nm are used for power pumping. The optical power from current commercial diodes can go up to 250 mW. But, much more power is needed for WDM Amplifiers, particularly for Raman Amplifiers.

One conventional solution as indicated in FIG. 1 for more power is to combine multiple pump lasers supplying light at different wavelengths and in different polarization states before launching into the transmission fiber. The polarization beam combiner (PBC) is used to combine two laser powers in the same wavelength as well as different wavelengths, but in orthogonal states. For more gain, it is desirable that the PBC has low loss. A pump multiplexer is then used to combine all laser powers in different wavelengths.

FIGS. 2A and 2B are two prior art PBCs. In FIG. 2A, multiple layers of dielectric material at the diagonal interface between the two prisms are utilized to combine two beams traveling at right angles to each other. A birefringent crystal in FIG. 2B is used to combine two orthogonally polarized beams but directed through two separate GRIN lenses apart from each other. The prior art PBCs of both FIG. 1 and of FIGS. 2A and 2B are bulky because the fibers are either oriented at right angles to one another or are transmitted using separate GRIN lenses.

It is therefore desirable to provide a low cost and easy-to install Polarization Beam Combiner that is more compact than the conventional PBCs.

SUMMARY OF THE INVENTION

This invention is based on the observation that, by employing the same GRIN lens to pass two input optical beams, where the two input beams are at different radial distances relative to the lens, a more compact PBC can be achieved. Since the two input optical beams are at different radial distances relative to the lens, the input beams will exit the lens at different angles. An optical member having transverse optical axes are then used to pass and combine the two beams exiting the lens, wherein the member has different indices of refraction along the two axes, thereby combining the two beams into one along an output channel.

BRIEF DESCRIPTION OF THE DRAWINGS

FIG. 1 is a block diagram of polarization beam combiner to illustrate an application of pump lasers.

FIG. 2A is a cross-sectional view of another PBC to illustrate another conventional design.

FIG. 2B is a cross-sectional view of a PBC to illustrate yet another conventional design.

FIG. 3A is a cross-sectional view of a PBC to illustrate an embodiment of the invention.

FIG. 3B is a cross-sectional view along the line 3B—3B in FIG. 3A.

FIG. 3C is a schematic view illustrating one of the optical axes of the optical member 322 of FIG. 3A.

FIG. 3D is a cross-sectional view along the line 3D—3D in FIG. 3A.

FIG. 3E is a view of member 322 and two beams exiting the GRIN lens of FIG. 3A to illustrate the operation of the invention.

FIG. 4 is a schematic diagram illustrating a beam passing through the PBC of FIG. 3A in reverse direction to illustrate the embodiment of FIG. 3A.

For simplicity in description, identical components are labeled by the same numerals in this application.

DETAILED DESCRIPTION OF THE EMBODIMENTS

FIG. 3A illustrates a compact and low cost Polarization Beam Combiner, which uses only one birefringent crystal. Two polarization Maintaining (PM) fibers, 301 and 302 are embedded in a glass ferrule 310. Polarization Maintaining fibers are designed to maintain the signal in the polarization state that it was in when it entered the fiber. For more details regarding PM fibers, please refer to pages 81–84 in "Understanding Optical Communications," 1998, by Harry Dutton. The cross-section view 3B—3B in FIG. 3B shows the positioning of two fibers 301 and 302 in the glass ferrule 310, and the respective polarization states of the input beams that they maintain. For the purposes of illustration, fiber 301 is in x-polarized state and fiber 302 in z-polarized state. This means the beam exiting fiber 301 will be linearly polarized along the x-axis, and the beam exiting fiber 302 will be linearly polarized along the z-axis. The beams travel in directions transverse to the xz plane.

A birefringent crystal 322 made of a material such as $YVO_4$, $TiO_2$ and $LiNbO_3$ is sandwiched between two near-quarter-pitch GRIN lenses 321 and 323. The birefringent crystal is slanted with an angle in the range of about 3 to 30 degrees. The x-polarized and z-polarized beams emerging from fibers 301 and 302, respectively, are preferably collimated by GRIN lens 321. Because two fibers are positioned at different radii with respect to the central axis of GRIN lens 321 as shown in cross-sectional view of FIG. 3B, the two beams, Beam 1 and Beam 2, exit the GRIN lens 321 with slightly different exit angles before they enter the crystal 322. The incidence of two Beams on the crystal 322 is shown more clearly in FIG. 3E.

The optical axis of crystal 322 is chosen or oriented preferably to be along x-axis as shown in FIG. 3C, so that the polarizations of the two input beams are aligned with the axes of crystal 322. The other optical axis (not shown) of crystal 322 is transverse to axis 331, and preferably orthogonal to it, wherein the crystal has different indices of refraction along the two axes. Beam 1 and Beam 2 are extraordinary ray and ordinary ray, respectively, with respect to crystal 322. Therefore, Beam 1 and Beam 2 experience slightly different deflection at the front face 330 of the crystal 322, due to the different indices of refraction along the x and z axes experienced by the two beams. The wedge angle α of the crystal 322 is chosen to adjust the Beam 1 and Beam 2 so that they become parallel and actually combine into a single beam as they exit the crystal 322 along the axis 331 of the crystal 322. The collimated beam 331 is coupled to the output fiber 303 by the second GRIN lens 323.

The invention illustrated in FIG. 3A can be encapsulated in a cylindrical package. All input and output fibers are along the y-axis. This fiber configuration makes the installation easy.

FIG. 4 illustrates a process for determining the angle α of the crystal 322, given the difference between the radial distances of the two beams in channels 301, 302 from the axis of lens 321. A single beam passing from the right to the left along axis 331 will pass through and exit crystal 322 at two different angles $\theta_e$ and $\theta_o$. Since the passage of light in the system 300 is reciprocal, two input beams incident on the face 330 of the crystal 322 in the opposite direction at angles $\theta_e$ and $\theta_o$ will combine into a single beam along axis 331. Therefore, once the separation angle θ ($\theta=\theta_e-\theta_o$) between the two input beams exiting from lens 321 are known, the wedge angle α of the crystal 322 may be calculated according to the following equation:

$$\theta = \theta_e - \theta_o = \arcsin\left(\frac{n_e \sin\alpha}{n}\right) - \arcsin\left(\frac{n_o \sin\alpha}{n}\right)$$

which is derived using Snell's law, and where n is the index of refraction of the medium outside the crystal 322, and $n_o$, $n_e$ are the indices of refraction along the x and z axes respectively.

While the invention has been described above by reference to various embodiments, it will be understood that changes and modifications may be made without departing from the scope of the invention, which is to be defined only by the appended claims and their equivalents. All references referred to herein are incorporated by reference in their entireties.

What is claimed is:

1. An apparatus for combining at least two optical beams, comprising:

two optical input channels carrying two input optical signals in orthogonal polarization states, said two channels separated by a distance;

an output optical channel;

an optical member having transverse optical axes, wherein the member has different indices of refraction along the two axes, said member passing and combining the two optical signals towards the output optical channel; and a GRIN lens passing the two input optical signals from the two input channels towards the optical member, said lens positioned so that the two input channels are at different radial distances relative to the lens so that the input signals exit the lens at different angles, said optical member having two surfaces at an angle to each other, wherein the angle is such that the two optical signals combine into a single beam after passing through the two surfaces of the member.

2. The apparatus of claim 1, said two input signals having polarization planes substantially aligned with the optical axes of the member.

3. The apparatus of claim 1, said lens collimating the two input optical signals.

4. The apparatus of claim 1, said member including a birefringent material.

5. The apparatus of claim 1, said member having a surface facing the two input channels at an angle of 3 to 30 degrees to a direction perpendicular to the output channel.

6. The apparatus of claim 1, said member being wedge-shaped, having a wedge angle in the range of 3 to 30 degrees.

7. The apparatus of claim 1, said two optical input channels including two polarization maintaining optical fibers.

8. A method for combining at least two optical beams, comprising:

directing two input optical beams in orthogonal polarization states to a GRIN lens positioned so that the two beams are at different radial distances relative to the lens, and so that the input beams exit the lens at different angles; and passing the input beams after they exit the lens to an optical member having transverse optical axes, wherein the member has different indices of refraction along the two axes, said two beams exiting the lens at such angles that the member combines the two input optical beams into a single beam towards an output optical channel.

* * * * *